United States Patent [19]

Melton

[11] Patent Number: 4,538,948
[45] Date of Patent: Sep. 3, 1985

[54] HYDRAULIC ROUND BALE HANDLING SYSTEM

[75] Inventor: Michael A. Melton, Shelby, N.C.

[73] Assignee: Melton Brothers Equipment, Inc., Shelby, N.C.

[21] Appl. No.: 492,749

[22] Filed: May 9, 1983

[51] Int. Cl.³ .................. A01D 87/12; B65H 75/40
[52] U.S. Cl. .................. 414/24.6; 241/101 A; 414/555
[58] Field of Search .......... 414/24.5, 24.6, 526, 414/555, 546, 739, 7; 241/101 A, 101.7; 294/103.1, 103.2, 106, 107; 242/86.52, 86.5 R, 68.7, 86; 298/19 V, 22 F; 901/21

[56] References Cited

U.S. PATENT DOCUMENTS

| | | | |
|---|---|---|---|
| 3,587,218 | 6/1971 | Geary | 414/739 |
| 3,944,095 | 3/1976 | Brown . | |
| 3,958,772 | 5/1976 | Hynson | 414/24.6 |
| 4,044,963 | 8/1977 | Hostetler | 414/24.6 |
| 4,049,140 | 9/1977 | Roose . | |
| 4,088,272 | 5/1978 | Grillot | 414/24.5 |
| 4,090,624 | 5/1978 | Krein et al. . | |
| 4,091,946 | 5/1978 | Kraeft et al. | 414/555 |
| 4,095,706 | 6/1978 | Schwien et al. . | |
| 4,194,863 | 3/1980 | Vansickle et al. . | |
| 4,360,167 | 11/1982 | Beccalori et al. | 414/24.6 |
| 4,449,672 | 5/1984 | Morlock et al. | 241/101.7 |
| 4,454,999 | 6/1984 | Woodruff | 242/86.5 |
| 4,478,547 | 10/1984 | Den Boer | 414/24.5 |

FOREIGN PATENT DOCUMENTS 0085494  6/1920  Switzerland ............ 298/22 F

*Primary Examiner*—Leslie J. Paperner
*Attorney, Agent, or Firm*—Laurence R. Brown

[57] ABSTRACT

A manually controlled hydraulically driven round bale loading and transport system is self contained on a trailer that only need be moved by a pick-up truck or the like. It has a wide arc full control lifting mechanism that permits lifting a bale from the ground and about a 160° arc to a storage rack. This permits a second bale to be held in the lifting mechanism. A pair of grasping arms has the respective arms disposed on each end of the bale by separate manual hydraulic controllable pivot action permits picking up bales directly from uneven terrain. Bales may be unrolled by a hydraulic motor from standstill position, but conventional unrolling on the ground is permissible. Hydraulic control valves are located to permit viewing each bale end as the respective grasping arms are manipulated and the bale partially lifted by one end to permit grasping on the center line for good balance and proper unrolling.

12 Claims, 11 Drawing Figures

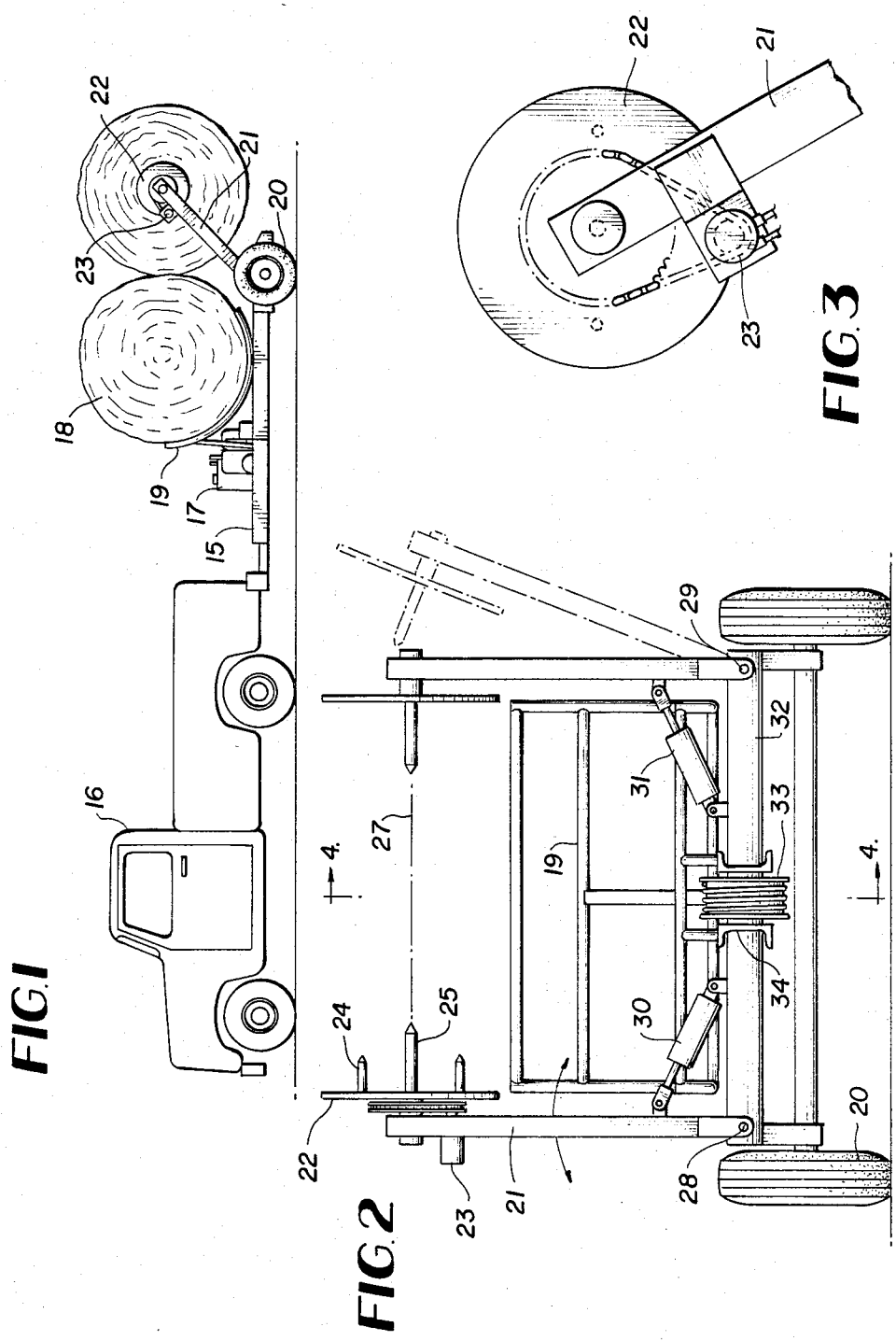

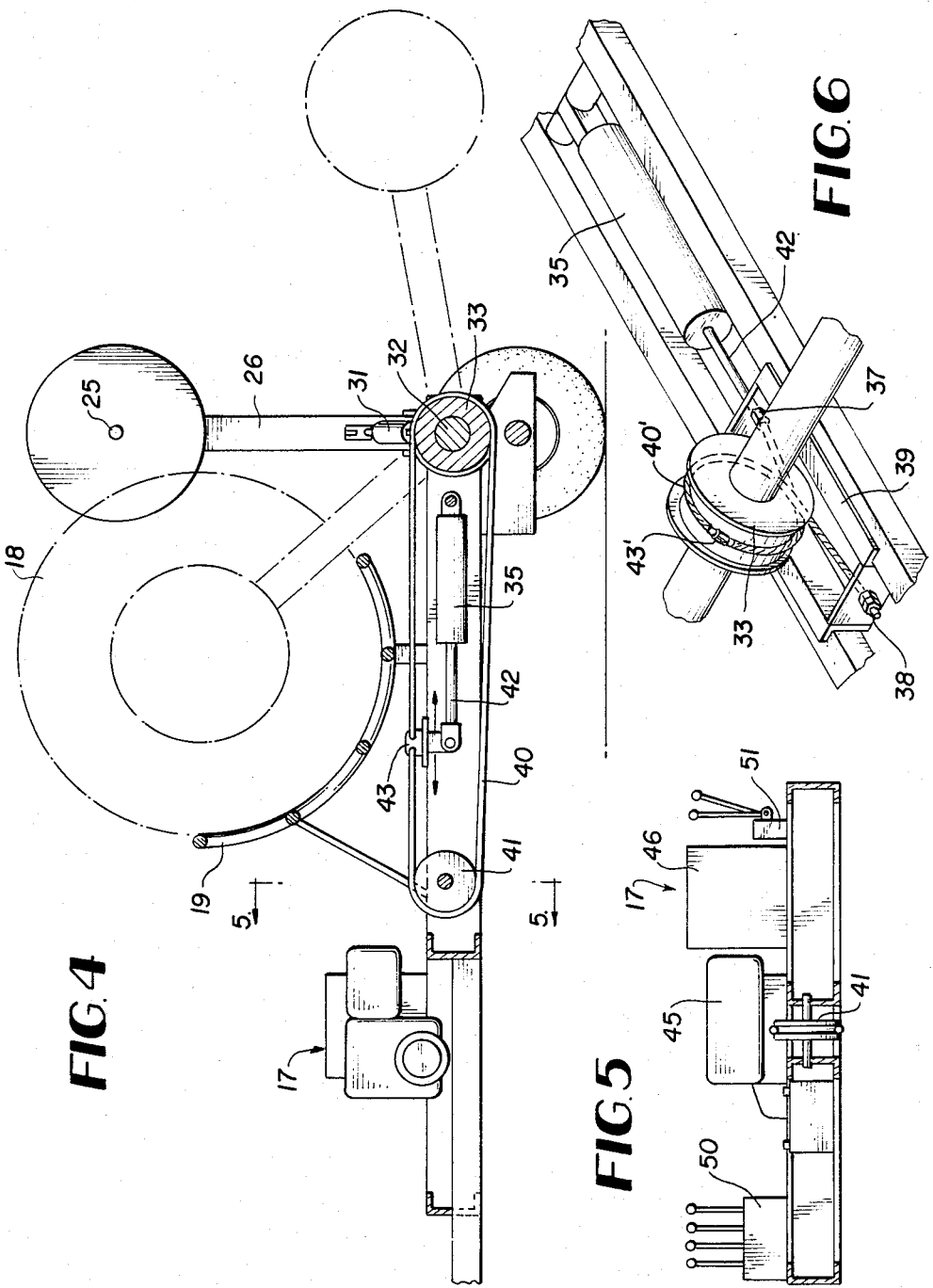

HYDRAULIC ROUND BALE HANDLING SYSTEM

TECHNICAL FIELD

This invention relates to the handling of round hay bales and more particularly it relates to mechanisms for picking up, transporting and unrolling round bales.

BACKGROUND ART

Round hay bales are too large and heavy for manual handling and thus need be handled by machinery. These bales need be moved from a field site to a barn, storage or usage site. Furthermore, they need to be unrolled for use in feeding at a feed site. Because of their size and shape the machinery need be specially adapted to the dimensions and characteristics of the round hay bales. Examples of such machinery in the prior art may be generally classified as transport devices and as dual purpose loader-unrollers.

Typical transport devices include U.S. Pat. Nos. 4,095,706—H. B. Schwien et al.—June 20, 1978 and 3,944,095—R. L. Brown—Mar. 16, 1976 and provide a trailer with a winch for grasping and swinging a round bale up for transport by pivoting a rack engaging the bale to raise it off the ground behind the trailer for transport, and U.S. Pat. No. 4,194,863—J. D. Vansickle et al.—Mar. 25, 1980 provides a set of lifting arms operated by hydraulic cylinders on each side of a tractor to raise a bale off the ground in front of the tractor.

The unrolling of bales has been generally achieved by simply using the transport device to lower the bale on the ground behind the transport device to unroll the layer by rolling the bale on the ground as shown in U.S. Pat. Nos. 4,044,963—D. L. Hostetler—Aug. 30, 1977; 4,049,140—G. L. Roose—Sept. 20, 1977; and 4,090,624—V. R. Krein et al.—May 23, 1978.

These prior art bale handlers, however, have not resolved many critical problems afforded because of the characteristics of the bales and the manner of use and storage.

For example, it is cumbersome and unsatisfactory to unroll the bales by rolling on the ground. First they must be oriented in the right direction for unrolling. Then they need a lot of room for unrolling. Then if hay is to be fed in a rack or barn, the unrolled hay has to be rehandled.

Another unresolved problem in picking up rolls placed at random in a field is that the rolls are generally spiked by penetrating rods at each end center roll and then handled. However, with varying and uneven ground contour, it is necessary to resposition bales when one of the spikes would be off-center in a tilted rest position with respect to the transport lifter.

Also when it is desired to load and transport the bales, the matter of load and balance is most important in terms of trailer coupling, riding security and safety, etc. In particular, if more than one bale is to be transported, the matter of lifting and positioning the bales requires very complex mechanisms. To be more explicit, it is most difficult with a simple reliable mechanism, for example, to lift a bale from the ground to place it on a trailer bed for transport. Consider that an arc movement of the order of 160° is necessary, and that about the greatest art available from simple pivoting movement responsive to a hydraulic ram is only about 120°.

Furthermore, it is difficult to provide a completely self contained, simple low cost mechanism fully powered for the lifting and handling of the rolls. For example, if hydraulic mechanisms are used they in the prior art required a compatible truck or tractor equipped hydraulic system, which is not always available and which if used thus necessitates expensive transport equipment. Clearly the prior art did not know how to provide a low cost comprehensive self contained trailer system that could simply be transported by a pick-up truck, or the like.

Accordingly, it is an objective of this invention to resolve the aforesaid shortcomings of the prior art and to provide improved self contained hydraulic actuated round bale handling equipment trailer mounted for transport by any convenient mode of transport, including pick-up truck.

DISCLOSURE OF THE INVENTION

A hydraulically actuated self contained round bale handler is mounted on a trailer for picking up and storing two bales and for unwinding the bales for use. The trailer is transported, for example, by a pick-up truck.

Several features provided by the invention include a hydraulically powered bale turning unwinding mechanism for stationary unrolling, handling features for lifting bales tilted on uneven terrain, self contained power without requiring a truck or tractor with a hydraulic system, ability to pick up a bale from the ground and pivot it about to a storage position on the trailer with simple hydraulic ram drive, and a hydraulic system permitting the bales to be unrolled on the ground.

Thus, two independently acting outwardly pivoting spike arms are controlled by respective hydraulic rams to permit an unevenly disposed bale to be lifted with both spikes centered. Thus, one spike is inserted at the lower end of the bale and the lifting ram that lifts the end of the bale from the ground to level the bale end centers. Then, the second spike arm can be inserted at bale center in the other (higher) end by operation of the second ram for proper bale centering before loading of the bale by retention between both spike arms.

A hay feeding feature is provided for cradling a bale, rotating it in the cradle past a rotating auger which removes and tears up the outer layer and feeds the loosened hay out by a moving conveyor belt.

Other features, objects and advantages of the invention will be found throughout the description, claims and drawings.

BRIEF DESCRIPTION OF THE DRAWINGS

In the drawings:

FIG. 1 is an elevation sketch of a trailer afforded by this invention carrying two round bales and coupled to a pick-up truck for transport;

FIG. 2 is an end view looking into the rear of the trailer;

FIG. 3 is a fragmental sketch of a bale rotating hydraulic drive mechanism;

FIG. 4 is a side section view of the trailer taken along lines 4—4 of FIG. 2;

FIG. 5 is a partial rear end view looking into the trailer hitch from lines 5—5 of FIG. 4 to show the hydraulic system and controls;

FIG. 6 is a perspective sketch of an alternative hydraulic drive embodiment for pivoting a bale from the ground into storage position;

THE PREFERRED EMBODIMENT

Figure 7:
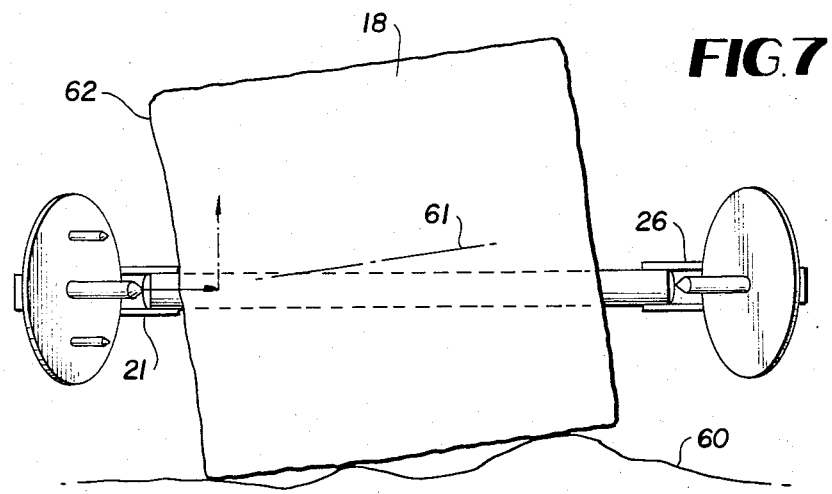
FIGS. 7 and 8 are partial sketches looking into the rear end of the trailer showing the mode of handling of bales on uneven terrain.

As may be seen in FIG. 1, round bale handling and transporting apparatus is mounted on trailer 15 under tow by pick-up truck 16. Mounted on the trailer 15 is a self contained power unit 17 with a portable gasoline motor and a hydraulic system for lifting the bales 18 from the ground to a transport position. A rack or cradle 19 holds one bale 18 in storage position residing there by force of gravity forward of the trailer wheels 20. A second bale is held in transport position rearward of wheels 20 for proper balance by grasping means having pivotable arms 21 movable over a large enough arc (approximately 160°) swinging about a pivot about the ground at wheel level thereby to lift bales from the ground and to deposit them in the storage rack 19.

Upon a motorized rotatable plate 22 supported on pivotable grasping arm 23 and chain driven from hydraulic motor 23, as better seen from FIGS. 2 and 3, are mounted at least two bale penetrating spikes 24. The center spike 25 is registered with the center of the bales 18 which are generally cylindrical in shape with substantially parallel ends. Thus, the bales 18 may be rotated about their center of gravity for unrolling to use the hay from a fixed position such as in or near a barn or feeding trough. Also, the motor can be bidirectional so that a bale need not be picked up in any special orientation. The bales are grasped between two pivoted arms 21, 26 which penetrate spikes 25 into the opposite ends of a bale 18, and thus permit the bale to rotate about an axis 27 defined between the spikes 25.

The two spaced grasping arms 21, 26 are pivoted above the ground at respective pivot points 28, 29 to swing outwardly from the trailer in the manner shown by the phantom view of arm 26. For reasons more carefully explained later each arm 21, 26, respectively, is controlled by an independent manually actuated hydraulic ram 30, 31.

In order to lift the bales 18 and swing them by means of arms 21, 26 over the arc from ground upward, the shaft 32 is affixed to drum 33 for pivoting in frame members 34 or the like, about an arc of approximately 160°, as better seen from FIG. 4. Note that as set forth in the referenced U.S. Pat. No. 4,090,624 there is a problem of obtaining the desired arc swing under control of a single pivoting hydraulic ram limited to a 120° swing. Thus, in the patent a lost motion mechanism is required for dropping a bale into place. That is dangerous because control is lost when the bale falls and its operational mode causes short mechanism life. Other complex mexhanisms and linkages are undesirable because of cost and unreliability in the environment of loose hay and dust.

This problem was resolved by connecting a cable 40 about two rotary members, namely an idler wheel 41 and the drum 33 affixed to shaft 32 to rotate arms 21, 26, and coupling the reciprocating member 42 of the hydraulic ram 35 for linear movement of the cable 40 at clamp 43. Thus, ram 35 and reciprocation member 42 is mounted substantially parallel to the cable 40 and is affixed thereto for mutual reciprocation. Preferably, as seen in FIG. 6 the modified cable 40' rig and single drum wheel 33 is operated by reciprocation member 35. Thus, both ends of the cable 40' wound about drum 33 are connected to two extremities of the slide box 39, at 38 and 37. Adjustment bolt 38 permits tightening of the cable for removing slack. An intermediate portion of the cable between ends 37, 38 is anchored for drive by clamp 43' on the circumference of drum wheel 33. Thus, as the piston 42 moves back and forth with slide box 39, the drum wheel 33 rotates over more than 180°, if desired.

As seen from FIG. 5, the self contained power unit 17 has a gasoline powered motor-hydraulic pump assembly 45 and a hydraulic fluid reservoir 46, with appropriate system connections as later described. The trailer unit therefore provides a complete bale lifting, handling, storage and transport capability with manual control over all the lifting, handling and storage functions by means of four manually controlled hydraulic valves 50. Thus, separate control is afforded for (1) the lifting of the bale, (2) the rotation of the bale, and (3)(4) independent pivoting of the two separate bale grasping arms by the respective hand lever controls. As will be later made clearer, the round bales 18 are so large that it is not feasible to see both ends of the bale for entering the grasping spikes (25) precisely at the center of the bales from any single control position. Thus, the master control set 50 from which one bale end is visible is supplemented by a set 51 of two additional manually actuated control valves on the opposite side of the trailer frame where the other bale end is visible. These two control valves therefore control the ram for the independently movable grasping arm visible from that trailer side and the lift ram.

Figure 8:
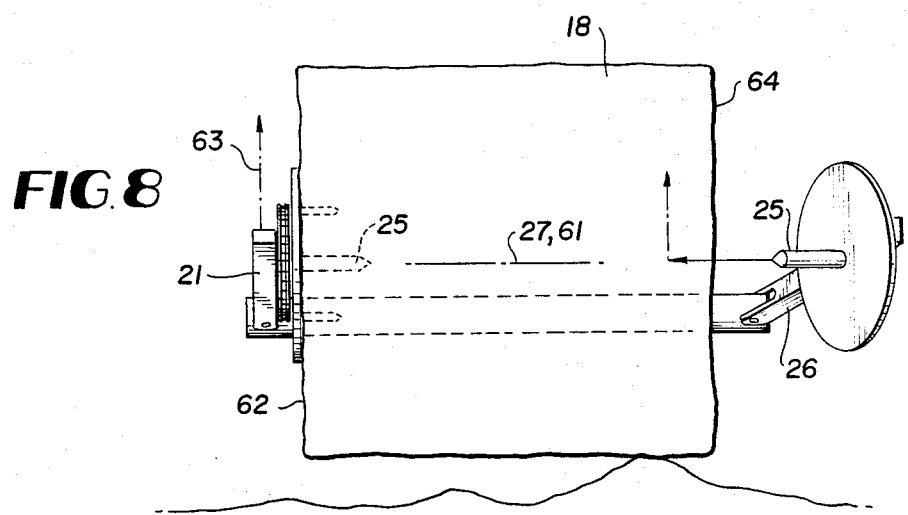

FIGS. 7 and 8 display the significant advantage of the separately actuable pivoted bale grasping arms 21, 26 (FIG. 2). The bales 18 are thus left in the field and when on uneven terrain 60 as seen in FIG. 7 will not rest with their centerline 61 horizontal. Thus, the present invention in operation provides for moving by control of the lift ram the arms 21, 26 to a position to insert first on that bale side 62 having the lowermost bale center position of the penetrating spike (from arm 21 in this example) as shown in FIG. 7.

Figure 9:
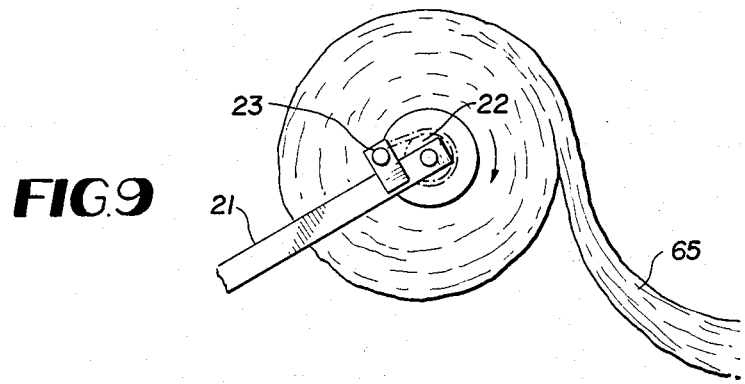
FIG. 9 is a sketch of a bale being unwound hydraulically.

Then as indicated by FIG. 8, the lower end of the bale 18 may be lifted by manual control of the lift arm as indicated by phantom line 63 to coincide the bale center line 61 with center line 27 between the grasping spikes 25 on either end of the bale. At that position the remaining pivot arm 26 is closed to grasp the bale 18 on end 64 so that it may be balanced for transport, and is free to rotate about its center by means of hydraulic motor 23 to unroll the outer layer 65 as shown in FIG. 9.

Figure 10:
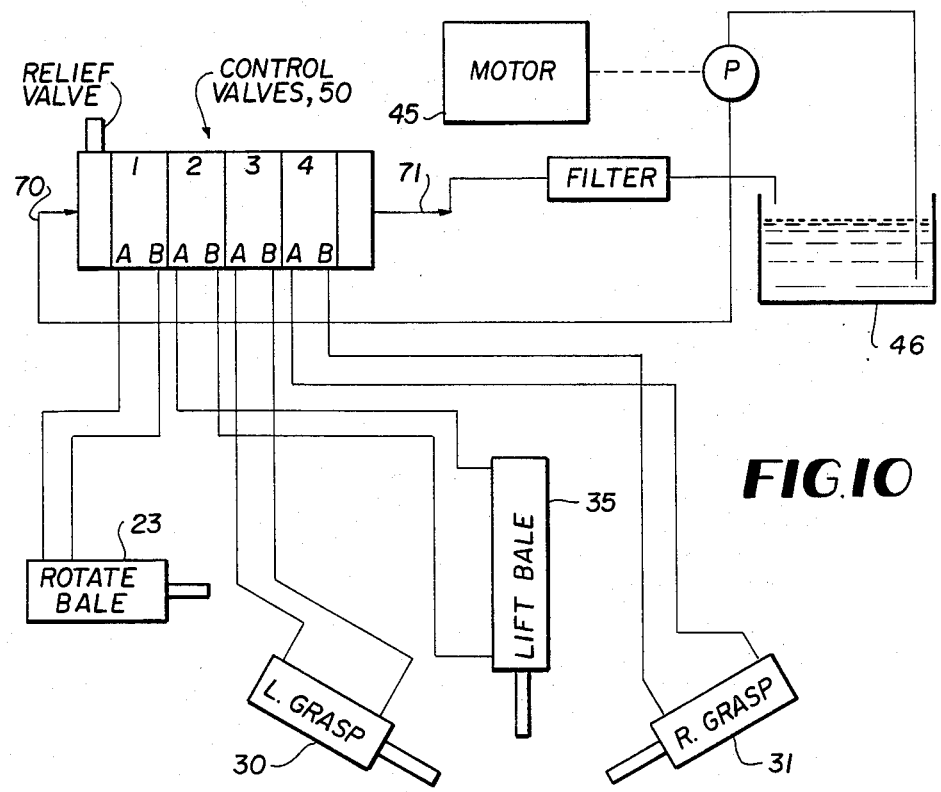
FIG. 10 is a diagrammatic layout of the self contained hydraulic system for handling the bales, as afforded by this invention.

In FIG. 10 is shown the hydraulic system connections of the self contained power unit afforded by this invention. It is clear that four control functions are manually operable by the hand lever control valves 1, 2, 3 and 4 of the assembly 50, namely (1) the bale rotation by means of hydraulic motor 23, (2) the bale lifting operation by means of ram 35, and the left (3) and right (4) bale grasping operation by means of rams 30 and 31.

It is a feature of this embodiment that at least two of the manual control valves 50 have a setting which opens up the fluid lines of the lift ram 35 and the rotation motor 23 to the outlet conduit 71 for return to the reservoir 46. This provides in essence a neutral position which enables the motor 23 and the lift ram 35 to "float" without power or control, so that in a neutral selected position the bale may be rolled on the ground to unroll the outer layer in a conventional manner without interference from the hydraulic system.

The valves may be "Husco Model 5000" sectional valves. The operating pressure from the pump is 2500 psi and hydraulic flow 5 gallons per minute.

Figure 11:
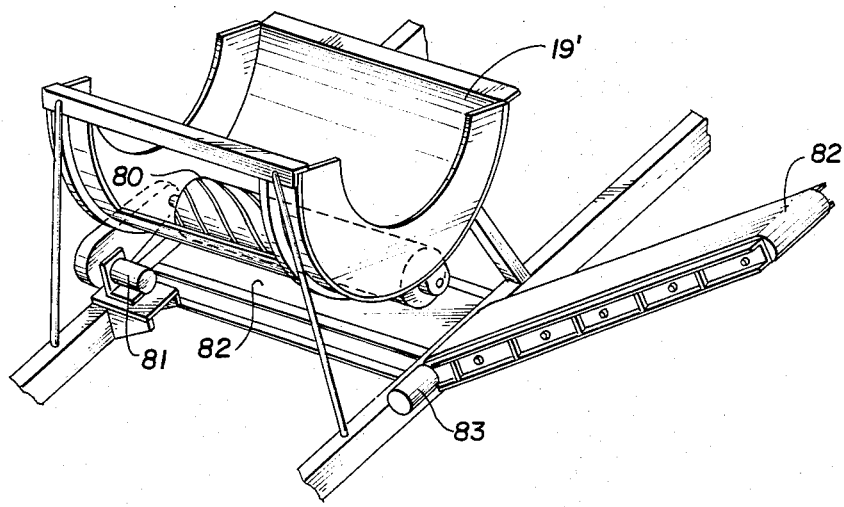
FIG. 11 is a perspective sketch of a bale feeder attachment afforded by this invention.

With reference to FIG. 11 it is seen that the cradle 19' is modified to have a hydraulic motor 81 for turning auger 80 placed in the bottom of the cradle for removing loose hay from the bale when lowered into the cradle 19'. By rotation of the bale in the cradle, the outer layer may be shredded to form loose hay. This loose hay then falls on and is carried by conveyor belt 82 operated by hydraulic motor 83 to a discharge position convenient for feeding or discharging.

The bale may be rotated in the cradle by "floating" as formerly discussed or by manual control of the lift mechanism to graze the outer layer over the auger ridges or teeth. The motors 81, 83 will be operable from the hydraulic system of FIG. 10 with at least one more manual control valve appropriately connected to operate the two motors during the loosening and dispensing mode supplied by this feature.

Having therefore advanced the state of the art, those features of novelty believed descriptive of the spirit and nature of the invention are defined with particularity in the appended claims.

I claim:

1. Ground supported handling and transport apparatus for generally cylindrically shaped round bales having substantially parallel ends, comprising in combination,
    a single hydraulic lift ram with a reciprocation member,
    grasping means comprising two spaced arms mounted to pivot on an axis located above the ground for grasping the ends of a bale and swinging it off the ground and upward about the axis,
    stop means for limiting the bale movement about said axis after a swing about the axis of approximately 160°, and
    means coupling the ram to said grasping means for controlling said swing of greater than 120° about said axis in response to reciprocation of said member comprising a flexible cable connected about a rotary drum member and moving the cable in opposite directions by said reciprocation member coupled for linear movement therewith, said rotary member being fixed for rotation about said axis with said grasping means thereby to swing said arms in opposite directions of rotation as the reciprocation member moves in opposite directions wherein said reciprocation member is coupled to two ends of said cable which has an intermediate portion of the cable wound about said rotary member and affixed thereto.

2. The apparatus defined in claim 1 wherein said reciprocation member is mounted substantially parallel to said cable and is affixed thereto for mutual reciprocation.

3. The apparatus defined in claim 1 wherein said stop means is a storage rack for receiving and storing a bale thereon by force of gravity.

4. The apparatus as defined in claim 3 wherein a first resident bale is stored in said rack and the grasping arms have therein a second resident bale lifted off the ground by a partial swing of the bale upwardly about said axis.

5. The apparatus as defined in claim 1 wherein the arms each have a spike for entering into the respective ends of the bales, a hydraulic pivot ram is coupled between each of said arms and a reference point for pivoting the arms independently over a range permitting the arms to open about the ends of a bale and squeeze together adjacent the ends of the round bale, and bale pick-up means actuating each of the pivot rams independently of each other and of said lift ram to thereby permit movement of the transport apparatus after one arm spike is entered into the bale and before the other spike is entered into the opposite end of the bale.

6. The apparatus as defined in claim 1 mounted on a trailer with a self contained power unit comprising a portable gasoline motor and a hydraulic system powered thereby to operate said ram.

7. The apparatus as defined in claim 6 including spikes on each arm to enter respective ends of the bale, two further separate hydraulic rams coupled for independently moving each of the spaced arms thereby to enter a first spike and permit movement of the transport apparatus before entering the other spike at the other end of the bale, and a hydraulic motor coupled to rotate a bale grasped between the spaced arms.

8. The apparatus as defined in claim 7 wherein the hydraulic system has a set of four manual control valves for control respectively of the three hydraulic rams and the hydraulic motor on one side of the trailer within view of one end of a bale to be handled, and a set of two manual control valves respectively for control of one grasping arm control ram and the lifting ram positioned on the other side of the trailer within view of the other end of a bale to be handled.

9. The apparatus as defined in claim 6 including a hydraulic motor coupled to rotate a bale grasped by the grasping means and manually controlled valves respectively for control of the lift ram and hydraulic motor with a bypass position for circulation of hydraulic fluid, thereby permitting the bale to be rolled on the ground to unroll it.

10. The apparatus as defined in claim 1 wherein the stop means comprises a cradle for receiving a bale, means for rotating the bale while in said cradle, and means for removing loose hay from the bale while rotated in the cradle.

11. Ground supported handling and transport apparatus for generally cylindrically shaped round bales having substantially parallel ends, comprising in combination,
    a single hydraulic lift ram with a reciprocation member,
    grasping means comprising two spaced arms mounted to pivot on an axis located above the ground for grasping the ends of a bale and swinging it off the ground and upward about the axis,
    stop means for limiting the bale movement about said axis after a swing about the axis of approximately 160°, and
    means coupling the ram to said grasping means for controlling said swing of greater than 120° about said axis in response to reciprocation of said member comprising a flexible cable connected about a rotary drum member and moving the cable in opposite directions by said reciprocation member coupled for linear movement therewith, said rotary member being fixed for rotation about said axis with said grasping means thereby to swing said arms in opposite directions of rotation as the reciprocation member moves in opposite directions wherein the stop means comprises a cradle for receiving a bale, means for rotating the bale while in said cradle, and means for removing loose hay from the bale while rotated in the cradle, and wherein said means for removing loose hay comprises a rotating member for engaging the bale to loosen and remove hay therefrom, and a conveyor for dispensing loose hay removed from the bale.

12. The improvement in a ground supported handling and transport device for round hay bales formed by rolling up layers of hay about longitudinally extending axes having grasping and positioning means penetrating the bales from opposite ends thereof characterized in that the penetrating means at one end are rotatable by a manually controllable hydraulic motor thereby to rotate the bales while grasped, a cradle for holding the bales in place by gravity while rotating, hydraulic motor driven means operating simultaneously to rotate the bales by said penetrating means and to drive an auger rotatable adjacent the cradle and placed to receive the bale by gravity thereagainst along an axis parallel to the bale axis for loosening hay from the outer layer of the bale while being rotated by said motor means and conveying means for receiving the loosened hay and transporting it to a discharge location displaced from the cradle.

* * * * *